No. 758,249. PATENTED APR. 26, 1904.
J. T. & T. C. HAYS.
CARBID FEED FOR GAS MACHINES.
APPLICATION FILED OCT. 1, 1903.
NO MODEL. 2 SHEETS—SHEET 1.
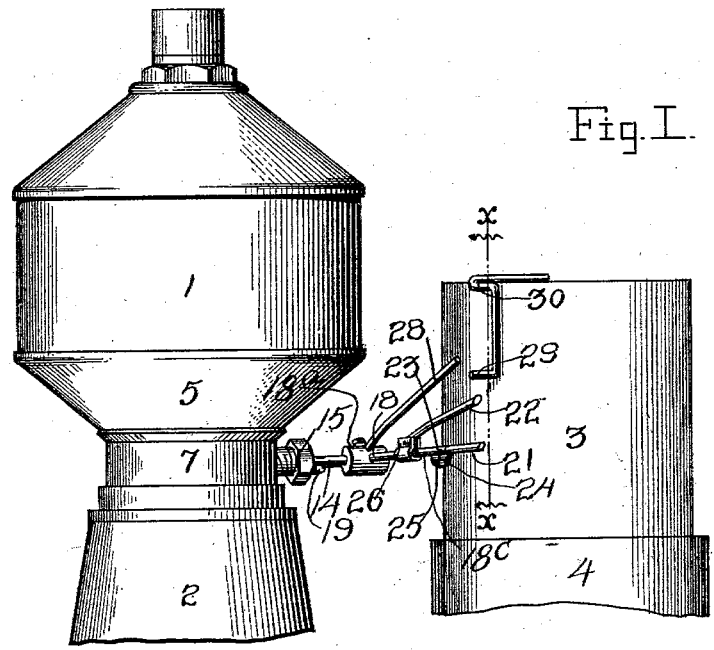
Fig. I.
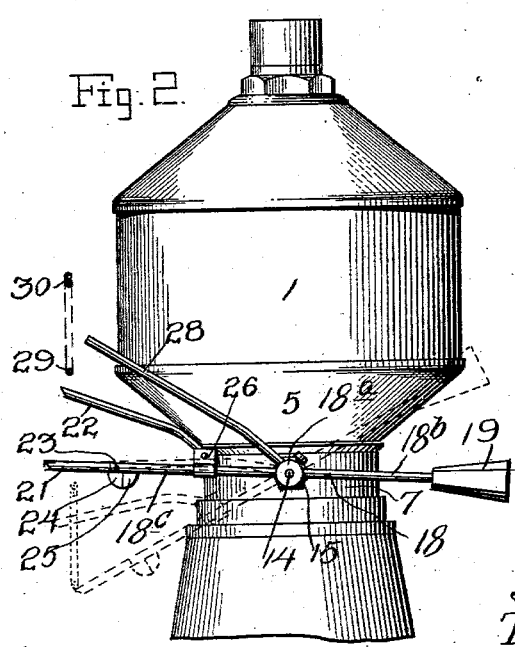
Fig. 2.
Witnesses
E. K. Reichenbach.
Inventors
James T. Hays and
Thomas C. Hays.
By H. R. Willson,
Attorney No. 758,249. PATENTED APR. 26, 1904.
J. T. & T. C. HAYS.
CARBID FEED FOR GAS MACHINES.
APPLICATION FILED OCT. 1, 1903.
NO MODEL. 2 SHEETS—SHEET 2.
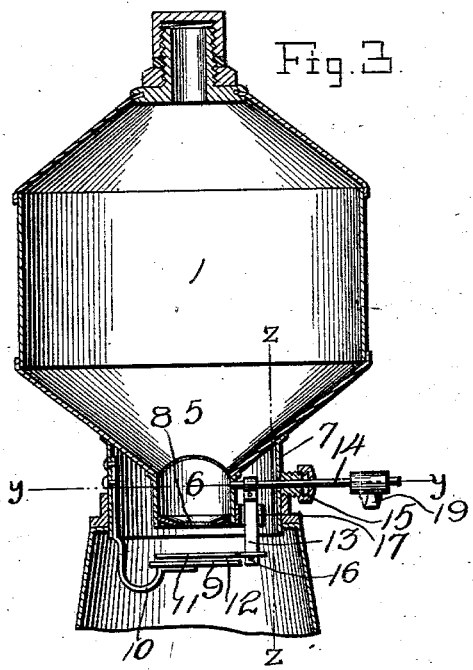
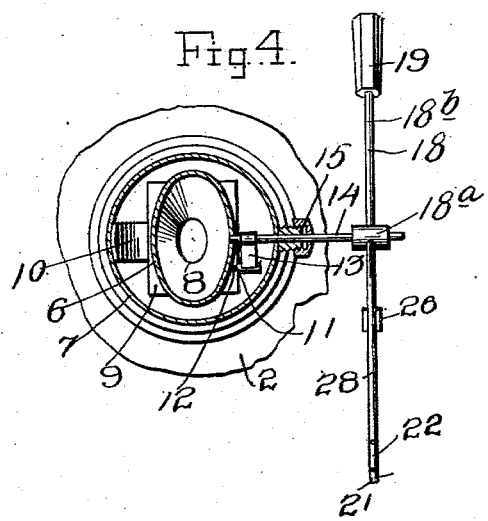
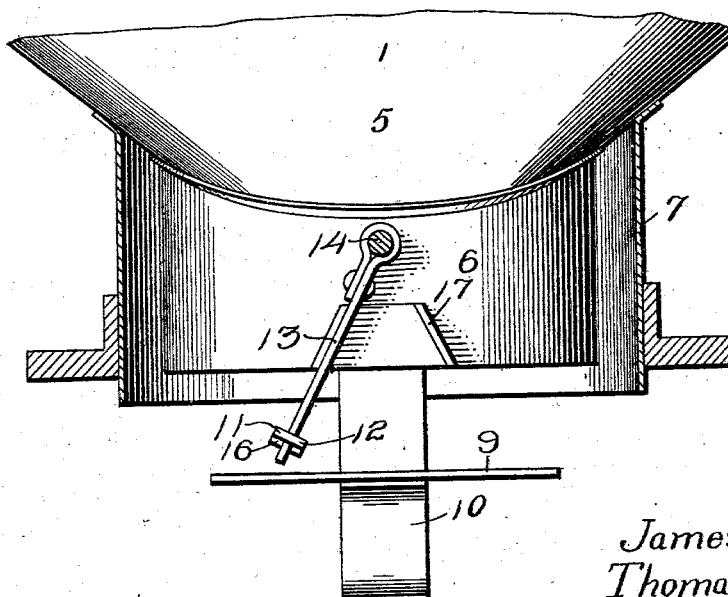
Witnesses
C. K. Reichenbach.
Inventors.
James T. Hays and
Thomas C. Hays.
By H. B. Wilson,
Attorney No. 758,249. Patented April 26, 1904.

UNITED STATES PATENT OFFICE.

JAMES T. HAYS AND THOMAS C. HAYS, OF EMMITSBURG, MARYLAND.

CARBID-FEED FOR GAS-MACHINES.

SPECIFICATION forming part of Letters Patent No. 758,249, dated April 26, 1904.

Application filed October 1, 1903. Serial No. 175,374. (No model.)

*To all whom it may concern:*

Be it known that we, JAMES T. HAYS and THOMAS C. HAYS, citizens of the United States, residing at Emmitsburg, in the county of Frederick and State of Maryland, have invented certain new and useful Improvements in Carbid-Feeds for Gas-Machines; and we do declare the following to be a full, clear, and exact description of the invention, such as will enable others skilled in the art to which it appertains to make and use the same.

This invention relates to automatic carbid-feeding devices for acetylene-gas machines.

The object of our invention is to provide a device of this character which will be simple in construction, comparatively inexpensive to manufacture, durable in use, and very efficient and positive in operation.

With this and other objects in view the invention consists of certain novel features of construction, combination, and arrangement of parts, as will be more fully described, and particularly pointed out in the appended claims.

In the accompanying drawings, Figure 1 is a side elevation of the upper portion of an acetylene-gas machine, showing the application of our invention thereto. Fig. 2 is a vertical sectional view taken on the line $x\ x$ of Fig. 1, showing the carbid-holder in side elevation. Fig. 3 is a vertical sectional view through the carbid-holder. Fig. 4 is a horizontal sectional view through the same, taken on the line $y\ y$ of Fig. 3. Fig. 5 is a vertical sectional view taken on the line $z\ z$ of Fig. 3.

Referring to the drawings by numeral, 1 denotes a carbid holder or hopper mounted upon an acetylene-gas-generator tank 2, and 3 denotes the usual gas-storage bell, sealed in a water-tank 4. These parts may be of any well-known or preferred construction.

The inclined or funnel-shaped bottom 5 of the carbid-holder 1 terminates at its center in a tubular portion 6, disposed within the neck 7, which connects the carbid-holder to the generator-tank. In the lower end or bottom of the tubular discharge portion 6 is a valve or discharge-opening 8, through which the carbid contained in the holder 1 is fed to the generator 2. Spaced below the valve or discharge-opening 8 is a stationary carbid-supporting shelf or plate 9. Said plate may be supported in a horizontal position in any desired manner, but preferably by a bracket or arm 10, having one end secured to the under side of the plate and its other end attached to the inner side of the neck 7. The plate is thus rigidly supported directly beneath the valve-opening 8 at a short distance from the same. The distance between the valve-opening and the plate and the relative sizes of the two are such that the carbid as it falls through the opening will pile up upon the plate and choke the opening, thus checking or preventing a continuous stream of carbid from dropping from the holder.

In order to discharge the carbid from the plate or shelf 9 and feed it to the generator, an oscillating sweeper or knocker 11 is provided. Said knocker is in the form of bar 12, secured upon the end of an oscillating or swinging arm 13, carried by a horizontal shaft 14, which is journaled in bearings in the tube 6 and neck 7 and which projects through a stuffing-box 15 upon the outside of the neck 7. The bar 12 is preferably loosely attached to the arm, as shown, the end of the arm passing through a slot in the bar, and a cross-pin or key 16 holding said bar in position. If so desired, the bar may be supported at both ends, in which case the shaft 14 extends entirely through the tube 6 and carries at its end an arm similar to the arm 13. In order to limit the movement of the feed-bar 12, stops 17 are provided on the outer side of the tube 6 to engage the arm 13 and limit its swinging movement. It will be seen that each time the bar 12 is oscillated across the top of the plate 9 it sweeps the carbid upon the same off into the generator-tank.

Any desired means may be provided for operating the shaft 14; but we preferably do this automatically as the gas-bell lowers. Upon the outer end of the shaft 14 is an operating-lever 18, which comprises a sleeve $18^a$, fixed to said shaft, an arm $18^b$, provided with a weight 19, and an arm $18^c$, provided with two trip-fingers 21 and 22. The finger 21, which forms a continuation of the arm $18^c$, is pivoted in the bifurcated end of the same at 23 and carries a stop 24, which engages a stop 25 upon the under side of the arm to limit the downward movement of the finger. The finger 22 is disposed above the finger 21, being pivoted between lugs 26, projecting up from the arm 18ᶜ and having its downward-swinging movement limited by said lugs. By this construction it will be seen that both of said fingers may be swung upwardly from their pivot-points without moving the operating-lever; but they cannot be moved downwardly below the limit of their pivoted movement without also carrying the operating-lever with them. Disposed above the upper finger 22 is a rigid finger or arm 28, which is connected to the sleeve 18ᵃ, and hence moves with the operating-lever for a purpose hereinafter explained.

In order to operate the lever 18, the gas-bell 3 is provided with two trips 29 and 30, disposed one above the other and secured to the top of the bell. Said trips are preferably formed by bending a single piece of metal rod, as shown, to form the horizontally-projecting trips 29 and 30. The outer ends of the trip-fingers 21 and 22 lie normally in the path of these trips, which move vertically up and down with the gas-bell, according to the variation of the quantity of gas it contains. As the bell lowers the trips 29 and 30 will successively engage, depress, and slip off of or disengage each of the fingers 21 and 22, thus operating the shaft 14 four times to cause the sweeper-bar 12 to be oscillated across the carbid plate or shelf and make a similar number of discharges of carbid into the generator. It will be seen that each trip acts independently, the lower trip first engaging and operating the two pivoted fingers in succession and the upper trip then repeating the operation. The weight 19 will return the lever to its original position after each engagement of one of the trips with one of the fingers in the downward movement of the bell. As the bell rises the trips 29 and 30 will again successively engage the fingers 21 and 22 upon their under side; but since they are both pivoted to swing upwardly the trips will elevate and pass under them, as will be readily understood. Should the carbid upon the shelf or plate become compact or should the parts work so hard that the weight 19 is not sufficient to restore the operating-lever to its normal position, one or the other of the trips 29 and 30 will engage the end of the rigid arm or finger 28, and thus positively return the lever to its original position. The end of the finger or arm 28 is not in the path of movement of the trips 29 and 30 when the lever is in its normal position, as shown by the full lines in Fig. 2; but when the lever is depressed, as indicated by the dotted lines in said Fig. 2, the arm 28 is moved into the path of movement of the trips.

The operation and advantages of our invention will be readily understood from the foregoing description, taken in connection with the accompanying drawings.

It will be seen that by means of the device a simple, automatic, and positive feed of carbid is produced and all danger of an overcharge is overcome, since the carbid can only be discharged from the supporting-plate by the oscillatory sweep or knocker.

Various changes in the form, proportion, and the minor details of construction may be resorted to without departing from the principle or sacrificing any of the advantages of this invention.

Having thus described our invention, what we claim as new, and desire to secure by Letters Patent, is—

1. In an automatic carbid-feed, the combination with a movable gas-bell, and a carbid-holder having a discharge-opening, of a stationary carbid-supporting plate spaced from said discharge-opening and adapted to check the flow of carbid from the same, a shaft, an arm carried thereby, a sweep-bar carried by said arm and adapted to be oscillated across said carbid-supporting plate, stops for limiting the movement of said arm, a weighted lever upon said shaft, pivoted trip-fingers upon said lever, a rigid finger carried by said lever, and trips carried by said bell and adapted to depress said pivoted fingers in their downward movement and to elevate and pass under the same in their upward movement, said rigid finger being normally out of the path of said trips upon the bell and adapted to be actuated only by the upward movement of the trips should the lever fail to return to its normal position, substantially as described.

2. In a gas-machine, the combination with a gas-bell, and a carbid-holder having means for discharging its contents, of a lever for operating said means, a weight for holding said lever in its normal position, pivoted trip-fingers upon said lever, a rigid finger carried by said lever, trips carried by said gas-bell and adapted to depress said pivoted fingers in their downward movement and to elevate and pass under the same in their upward movement, said rigid finger being normally out of the path of the trips upon the bell and adapted to be actuated by the same only when the weight upon said lever fails to restore it to its normal position, substantially as described.

3. In an apparatus of the class described, the combination of a carbid-holder having a discharg-opening, a stationary carbid-supporting element spaced below said opening, an oscillating sweep having its pivot in a plane above the carbid-supporting element, said sweep being mounted to swing transversely under the discharge-opening, across and in a vertical plane above the carbid-supporting element, and in the arc which approaches the center of said supporting element and rises and recedes from the opposite sides thereof, whereby the sweep when moved in either direction first descends and approaches and then rises and recedes from the supporting element, for the purpose set forth.

4. In apparatus of the class described, the combination of a carbid-holder having a discharge-opening, a stationary carbid-supporting element spaced below said opening, an oscillating sweep having its pivot in a plane above the carbid-supporting element, said sweep being mounted to swing transversely above the discharge-opening, across and in a vertical plane above the carbid-supporting element and in an arc which approaches the center of the supporting element and rises and recedes from the opposite sides thereof, whereby the sweep when moving in either direction first descends and approaches and then rises and recedes from said supporting element, and means to normally support the sweep in an elevated position at one limit of the stroke thereof.

5. In a gas-machine, the combination with a gas-bell and a carbid-holder having means for discharging its contents, of a counterbalanced lever for operating said means, a pivoted finger upon said lever, a rigid finger carried by said lever, a trip carried by said gas-bell and adapted to depress said pivoted finger in its downward movement and to elevate and pass under the same in its upward movement, said rigid finger being normally out of the path of the trip upon the gas-bell and adapted to be actuated by the same only when said lever fails to return to its normal position, substantially as described.

In testimony whereof we have hereunto set our hands in presence of two subscribing witnesses.

JAMES T. HAYS.
THOMAS C. HAYS.

Witnesses:
HARRY E. WEANT,
WILLIAM H. TROXWELL.